United States Patent
Nashiki

[11] Patent Number: 5,793,139
[45] Date of Patent: Aug. 11, 1998

[54] ELECTRIC MOTOR HAVING STATOR'S SALIENT POLES OF THE STATOR SLIGHTLY SHIFTED FROM SALIENT POLES OF THE ROTOR

[75] Inventor: Masayuki Nashiki, Niwa-gun, Japan

[73] Assignee: Okuma Corporation, Nagoya, Japan

[21] Appl. No.: 520,088

[22] Filed: Aug. 28, 1995

[30] Foreign Application Priority Data

Aug. 31, 1994 [JP] Japan .................................. 6-206558

[51] Int. Cl.$^6$ ........................................... H02K 1/00
[52] U.S. Cl. ................... 310/216; 310/217; 310/211; 310/179; 310/259
[58] Field of Search .................... 310/216, 254, 310/179, 217, 211, 261, 269, 259

[56] References Cited

U.S. PATENT DOCUMENTS 4,801,832  1/1989  Neumann ........................... 310/216
5,233,253  8/1993  Nishio et al. ........................ 310/24

Primary Examiner—Steven L. Stephan
Attorney, Agent, or Firm—Oliff & Berridge, PLC

[57] ABSTRACT

An electric motor generates a large torque despite its small size, causes small torque ripples, and is able to perform field-weakening control when the number of revolutions is large. The electric motor comprises a stator having m portions where large magnetic resistance and small magnetic resistance exist in the radial direction around the entire circumference, and a rotor having n portions where large magnetic resistance and small magnetic resistance exist in the radial direction around the entire circumference. The value |m−n| is an integer less than 3, m and n are large numbers. The stator is provided with two-pole, multi-phase stator windings. The structure such that the salient poles of the stator and rotor are shifted slightly from each other enables the motor to generate large torque and cause only small torque ripples.

4 Claims, 15 Drawing Sheets

5,793,139

ELECTRIC MOTOR HAVING STATOR'S SALIENT POLES OF THE STATOR SLIGHTLY SHIFTED FROM SALIENT POLES OF THE ROTOR

BACKGROUND OF THE INVENTION

1. Field of the Invention

The invention relates to an electric motor, and more particularly to an electric motor comprising a stator and rotor of improved structure.

2. Description of the Prior Art

FIG. 17 is a cross sectional view of a conventional synchronous motor having a salient two-pole rotor 128. A stator 126 is provided with 36 slots 127 for windings, and two-pole, three-phase a.c. windings shown in FIG. 18. The motor thus formed is housed in a casing 125.

With the three-phase a.c. windings capable of generating a magnetomotive force in any rotational position, the motor is designed to develop desirable torque by generating a magnetomotive force in a rotational position of the rotor.

The motor comprises a rotor position detector for detecting the rotational angle AR as shown in FIG. 17, and controls an appropriate three-phase current to develop desirable torque, thus performing speed and position control.

Besides the above method, it is possible to generate a magnetomotive force in a desirable driving position by the three-phase a.c. windings and move the rotor to the rotational position; and by repeating this operation, speed control and position control can be performed without detecting the position by open loop control.

FIG. 19 shows a conventional reluctance motor. A rotor 122 has four salient poles 124. A stator 121 has six salient poles 129A, 129B, 129C, 129D, 129E and 129F, with windings 123 provided for each salient pole. The windings of the salient poles 129A and 129D are wound in series, which are AD phase windings. The windings of the salient poles 129B and 129E are wound in series, which are BE phase windings. The windings of the salient poles 129C and 129F are wound in series, which are CF windings.

This motor obtains reluctance force by energizing the three-phase windings AD, BE and CF in this order in the direction in which the salient poles of the rotor 122 are magnetically attracted, thereby developing torque. The driving and application of this motor are similar to those of the aforementioned synchronous motor.

In the synchronous motor shown in FIG. 17, however, both ends of a magnetic pole cannot be used and therefore the magnetic field area becomes small. When the same current passes, torque generated is small compared with an induction motor. Furthermore, generating large peak torque is difficult due to the high abundance ratio of the field magnetic flux.

In the reluctance motor shown in FIG. 19, both stator and rotor are magnetically discontinuous in the direction of rotation, often causing large torque ripples.

SUMMARY OF THE INVENTION

It is an object of the invention to provide an electric motor which generates large torque despite its size,and causes only small torque ripples.

It is another object of the invention to provide an electric motor which can weaken the fields even at a high rotation speed.

To achieve the aforementioned objects, the first embodiment of the invention is an electric motor comprising a stator having m portions, in which large magnetic resistance and small magnetic resistance exist, in the radial direction around the entire inner periphery, and a rotor having n portions, in which large magnetic resistance and small magnetic resistance exist, around the radial direction on the entire outer periphery, which motor is characterized in that |m−n| is an integer less than 3, and the stator is provided with stator windings which wind around at least two portions of small magnetic resistance.

The second embodiment of the invention is an electric motor according to the first invention, in which the stator is provided with two-pole, multi-phase stator windings.

The third invention is an electric motor according to the first and second inventions, in which a plurality of elements of 360° electric angle are included in a mechanical angle of 360°.

The fourth invention is an electric motor comprising a stator having m portions, in which large magnetic resistance and small magnetic resistance exist in the radial direction around the entire inner periphery, and a rotor having n portions, in which large magnetic resistance and small magnetic resistance exist, in the radial direction around the entire outer periphery, which motor is characterized in that |m−n|=k, m>k, n>k, k is an integer larger than 2, and the stator is provided with stator windings which wind around at least two portions of small magnetic resistance.

The fifth invention is an electric motor according to the first to fourth inventions, in which an auxiliary means is included for inducing a magnetic flux which reduces torque toward magnetic paths where reduction in torque is smaller.

The sixth embodiment of the invention is an electric motor according to the first to fourth inventions, in which on the entire periphery of the motor, the width of portions where the magnetic resistance is large is greater than the width of portions where the magnetic resistance is small.

The seventh invention is an electric motor according to the first to sixth inventions, in which the magnetic circuits of the stator and rotor are formed by laminating electromagnetic steel sheets.

According to the invention, a plurality of torque generating means are formed in which the projections of the stator are slightly shifted away from the projections of the rotor, wherein m and n are large numbers and |m−n| is an integer less than 3. The output torque of the motor is the total of generated torques and therefore torque ripples are small at any rotational angle.

Providing windings common to the stator and the torque generating means and interlinking the magnetic flux of the torque generating means to the common windings at the same time, the motor of the invention can have a rate of rotational angle change in interlinked magnetic flux that is several times larger than that of a conventional motor. Thus, the windings develop a motor induction voltage several times larger than that in a conventional motor, enabling the motor to obtain greater power with the same current and to generate larger torque in terms of mechanical output.

The output torque can be further increased by means of auxiliary windings.

By reducing the width of each salient pole of the stator and rotor, the rotational angle of the magnetomotive force generated by the stator windings can be controlled, and the amount of interlinked magnetic flux of the stator and rotor can also be limited, whereby the internal magnetic energy generated in high rotation speed operation, or the reactive power of the motor driving device, can be reduced, thus improving its power efficiency. According to the invention, with the amount of interlinked magnetic flux controlled, it is also possible to perform field-weakening control at a high rotation speed, in other words, to perform steady power control. Since the amount of interlinked magnetic flux of the stator and rotor is controlled without limiting the magnetomotive forces of the stator windings, a greater current can be applied and greater peak torque output can be obtained in weakened fields at a high rotation speed.

Thus, according to the invention, the output torque of a motor is obtained by a plurality of torque generating means in which the salient poles of the stator are slightly shifted away from the salient poles of the rotor, and torque ripples caused therein are small.

The stator windings are also windings for the plurality of torque generating means, wherein the magnetic flux of the plurality of torque generating means is interlinked to the common windings at the same time. Accordingly, the rate of rotational angle change in interlinked magnetic flux is a few times larger than that of a conventional motor. As a result, the stator windings are able to generate motor induction voltage which is several times larger than that in a conventional motor, and large power can be applied with the same amount of current. The motor of the invention can generate larger power and larger torque, compared with conventional motors of the same size.

Further increase in torque output can be expected by auxiliary means, such as by-pass magnetic paths for inducing magnetic flux and flux inducing windings.

The width of each salient pole of the stator and rotor is minimized and the rotational angle of the magnetomotive forces generated by the stator windings is controlled, producing effects as follows.

First, the amount of the interlinked magnetic flux of the stator and rotor can be controlled and the internal magnetic energy generated in a high rotation speed operation, or the reactive power of the motor driving device, can be reduced, thus improving its power efficiency.

Second, with the amount of interlinked magnetic flux of each winding controlled, it is also possible to perform field-weakening control at a high rotation speed, in other words, to perform steady power control.

Third, since the amount of interlinked magnetic flux of the stator and rotor is controlled without limiting the magnetomotive forces of the stator windings, a greater current can be applied and greater peak torque output can be obtained in weakened fields at a high rotation speed.

DESCRIPTION OF PREFERRED EMBODIMENTS

Figure 1:
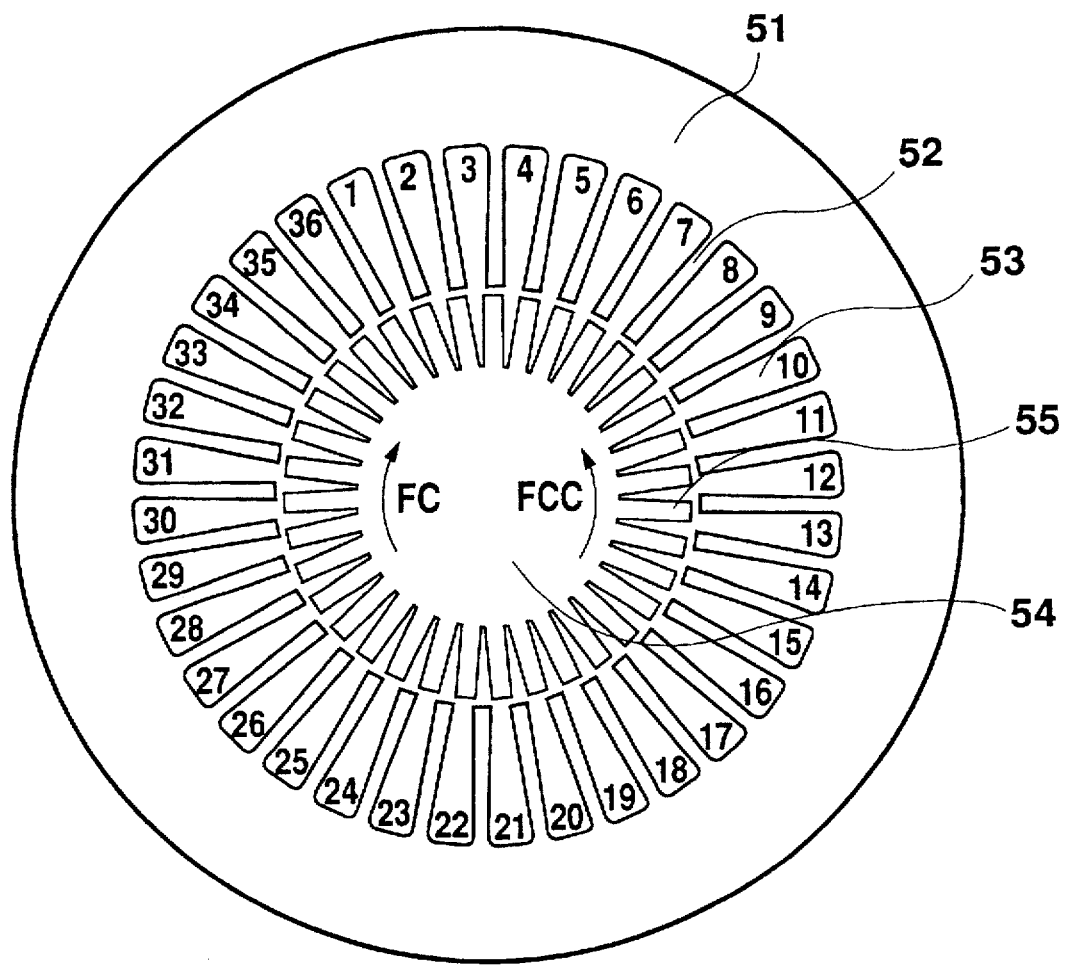
FIG. 1 is a cross-sectional view of an example of an electric motor according to the invention.

The preferred embodiments of the invention will be described with reference to the accompanying drawings. FIG. 1 is a cross-sectional view of an example of an electric motor according to the invention. A stator 51 of this motor has m concave portions where the magnetic resistance is large and projections where the magnetic resistance is small. In this embodiment, the stator has 36 projections which also serve as teeth 52, and which constitute slots 53 for motor a.c. windings. Each slot 53 is provided with a stator winding running through at least two portions of small magnetic resistance. The windings are two-pole, three-phase a.c. windings as in the conventional a.c. motor shown in FIG. 18. The numbers allotted to the slots 53 shown in FIG. 1 correspond to the numbers allotted to the motor windings shown in FIG. 18. Such motor windings which wind around the slots will be hereinafter referred to as windings N. A rotor 54 has n portions consisting of concaves where the magnetic resistance is large and projections where the magnetic resistance is small. In this embodiment, the rotor 54 has 35 projections 55. Thus, the relationship between the number of projections of the stator 51 and the number of projections of the rotor 54 is expressed as $|m-n|=1$; wherein as the rotor 54 makes a $\frac{1}{35}$th revolution, the motor makes one revolution and returns to its home position in which the projections of the stator 51 face the projections 55 of the rotor 54 and the magnetic resistance is small. The magnetic resistance between the stator 51 and the rotor 54 is the largest in the place shifted 180 degrees away from the place in which the magnetic resistance between the rotor 54 and the stator 51 is the smallest. The motor of this example is formed by laminating electromagnetic steel sheets in the axial direction. It is, of course, possible to use a non-magnetic material to form the similar magnetic circuit and produce the similar electromagnetic effects; which is also applied in the examples to be described below.

The operations of the motor of FIG. 1 will now be described.

Figure 18:
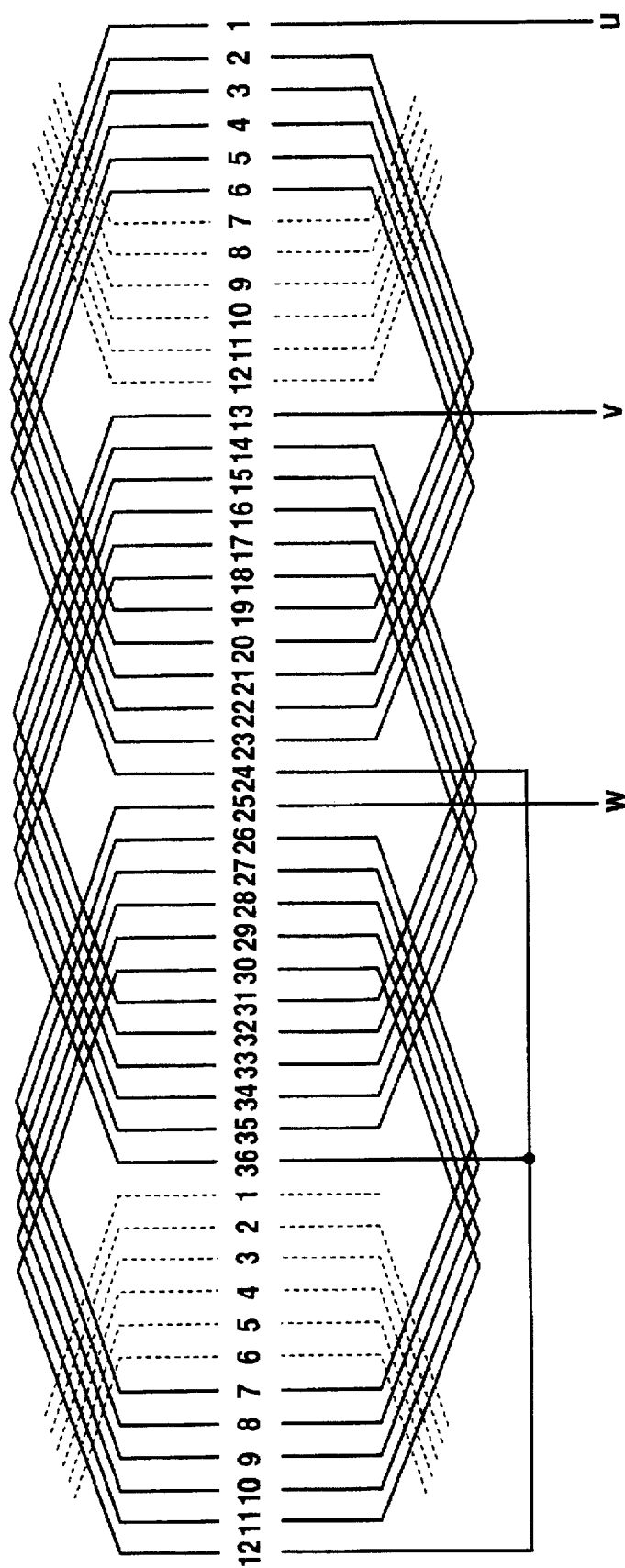
FIG. 18 is a schematic view illustrating the two-pole, three-phase a.c. windings of the stator of a conventional motor.
Figure 19:
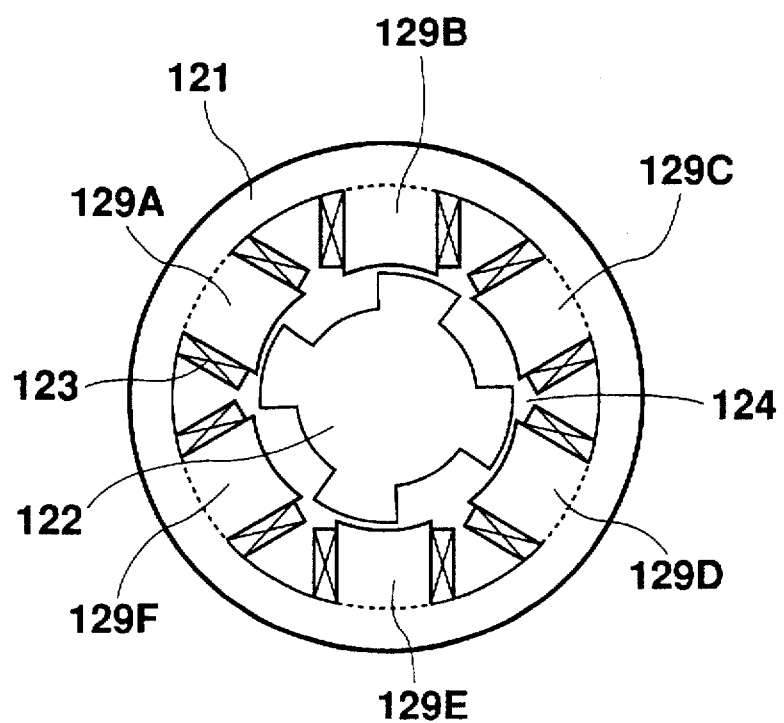
FIG. 19 is a schematic view of a conventional reluctance motor.

The slots 53 of this motor are provided with the two-pole, three-phase a.c. winding shown in FIG. 18. It is well known that a substantially sinusoidal magnetomotive force can be generated at any stator angle by passing an appropriate three-phase a.c. current through the stator windings, i.e. motor windings, while being controlled by a power transistor.

By passing a current through a winding 3 to a winding 21 which is situated in the opposite position to the winding 3, a magnetomotive force is generated from the right to the left in FIG. 1. In such a situation, however, no rotary force is generated, because the magnetic resistances of the stator 51 and the rotor 54 are symmetrical.

By passing a current through a winding 7 to a winding 25 which is situated in the opposite position to the winding 7, a magnetomotive force is generated from the lower right to the upper left in FIG. 1. In this situation, the magnetic resistances of the stator 51 and the rotor 54 are unbalanced, wherein the magnetic resistance on the lower-right side is relatively smaller than the magnetic resistance on the upper-left side, thus generating a counter-clockwise rotary force so that the magnetic resistance in the entire magnetic path in the direction of magnetomotive force becomes small. This rotary force will now be explained with reference to FIG. 2.

Figure 2:
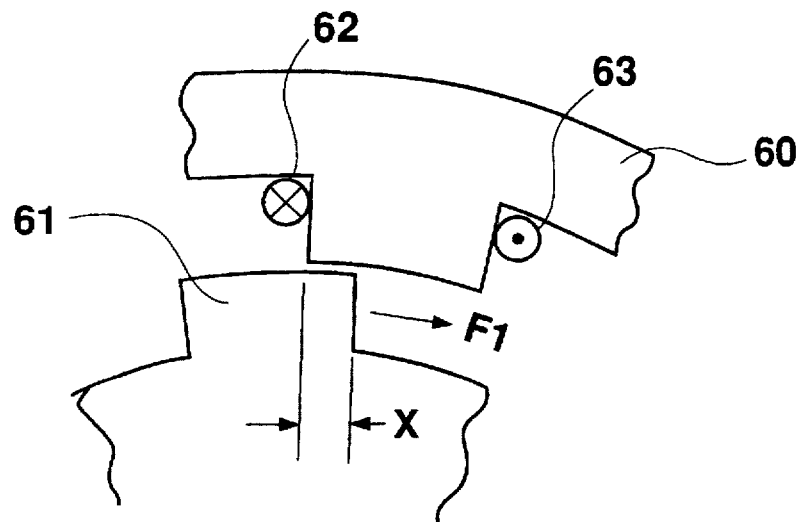
FIG. 2 is a schematic view illustrating the rotary force of the electric motor shown in FIG. 1.

FIG. 2 shows major components of the electric motor, including part of a stator 60, a projection 61 of the rotor, and motor windings 62 and 63. By passing a current CT through the motor winding 62 to the motor winding 63, a magnetomotive force is generated between the stator and the rotor, as is magnetic flux FL and a rotary force F1. The physical quantities of these can be analyzed as follows.

Figure 3:
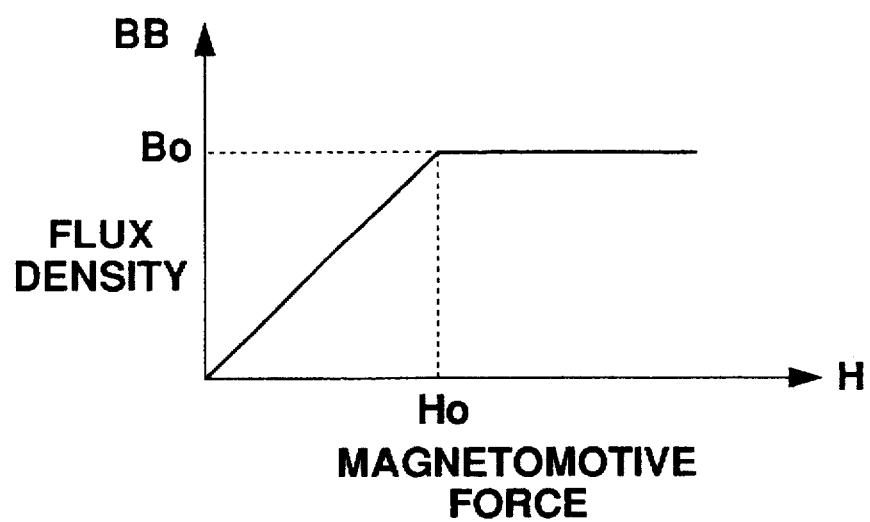
FIG. 3 is a diagram illustrating the relationship between the magnetomotive force and flux density.

The magnetic flux FL is numerically analyzed on the assumption that magnetic flux exists only in places where the air gap between the stator and the rotor is desirably small, and the projection of the stator and the projection of the rotor face each other. Also, it is assumed that a magnetomotive force H and a flux density BB have a relationship as shown in FIG. 3, and operate in a linear range in which magnetic saturation is not caused by the current CT. Generally, a magnetic resistance is dominant in the air gap, and in this example, magnetic resistance occurs only at the air gap. The number of turns of the motor windings 62 and 63 is one and the length of the stator and the rotor in the axial direction is L.

Besides the force that acts in the rotary direction, i.e. rotary force, there is a force that acts in the radial direction. Since the radial direction force is supported by the bearing of the motor or canceled by another force that acts in the radial direction in other part of the motor, no displacement occurs in the radial direction. Therefore, the radial direction force can be ignored numerically, and the work in the radial direction is zero.

On the assumption that a constant current CT passes through the motor windings 62 and 63 and the rotor operates in the F1 direction by the length $\Delta X$ in the time $\Delta t$, the applied power EIN is expressed as follows:

$$\begin{aligned} EIN &= V \cdot I \cdot \Delta t \\ &= \Delta FL/\Delta t \cdot CT \cdot \Delta t \\ &= BB \cdot \Delta X \cdot L \cdot CT \end{aligned} \quad (1)$$

The relationship among the magnetomotive force CT, the air-gap length LG, the area SS, the flux density BB, the permeability MY ($4\pi \times 10^{-7}$H/m), and the magnetic resistance MR is expressed as follows:

$$\begin{aligned} MR &= LG/(MY \cdot SS) \\ FL &= BB \cdot SS = CT/MR = CT \cdot MY \cdot SS/LG \\ \therefore BB &= CT \cdot MY/LG \\ EIN &= BB \cdot \Delta X \cdot L \cdot CT = \Delta X \cdot L \cdot CT^2 \cdot MY/LG \end{aligned} \quad (2)\ (3)$$

Since the magnetic energy is represented by the area on the left side in the BB-H chart of FIG. 3, the internal magnetic energy E1 of the motor and internal magnetic energy E2 measured after a minute change $\Delta X$ is expressed as follows:

$$\begin{aligned} E2 - E1 &= 1/2 \cdot \Delta FL \cdot CT \\ &= 1/2 \cdot BB \cdot \Delta X \cdot L \cdot CT \end{aligned} \quad (4)$$

The energy relationship before and after the minute change $\Delta X$ is expressed as follows:

$$\begin{aligned} EIN + E1 &= EO + E2 \\ \therefore EO &= EIN + E1 - E2 \\ &= BB \cdot \Delta X \cdot L \cdot CT - 1/2 \cdot BB \cdot \Delta X \cdot L \cdot CT \\ &= 1/2 \cdot BB \cdot \Delta X \cdot L \cdot CT \\ &= 1/2 EIN \end{aligned} \quad (5)$$

wherein EO is mechanical output energy.

Taking into account the mechanical output energy EO and Equations (3) and (5), the rotary force F1 of the motor is expressed as follows:

$$\begin{aligned} F1 &= EO/\Delta X \\ &= 1/2 \cdot BB \cdot \Delta X \cdot L \cdot CT/\Delta X \\ &= 1/2 \cdot BB \cdot L \cdot CT \\ &= 1/2 \cdot L \cdot CT^2 \cdot MY/LG \end{aligned} \quad (6)$$

Thus, the rotary force of the motor can be expressed using the current value CT, and L and LG, which are the sizes of the motor.

It can be concluded that the rotary force is proportional to L, which is the length of the motor, and to $CT^2$, which is the square of the value of current; the rotary force is inversely proportional to the air gap length LG. Half of the applied energy EIN is converted into the magnetic energy while the other half is converted into the mechanical output energy EO.

The above logic is based on the assumption that the motor operates in the place where no magnetic saturation occurs when the electromagnetic relationship is as shown in FIG. 3. In the case where magnetic saturation occurs, the applied power EIN is expressed as follows:

$$\begin{aligned} EIN &= V \cdot I \cdot \Delta t \\ &= \Delta FL/\Delta t \cdot CT \cdot \Delta t \\ &= B0 \cdot \Delta X \cdot L \cdot CT \end{aligned} \quad (7)$$

Even when magnetic saturation occurs, the amount of power applied is proportional to the current CT. Where a magnetomotive force that causes magnetic saturation is CT0 (value of current), the internal magnetic energies E1 and E2 are expressed as follows:

$$\begin{aligned} E2 - E1 &= 1/2 \cdot \Delta FL \cdot CT0 \\ &= 1/2 \cdot B0 \cdot \Delta X \cdot L \cdot CT0 \end{aligned} \quad (8)$$

Then, the rotary force F1 is expressed as follows:

$$
\begin{aligned}
F1 &= EO/\Delta X \\
&= (EIN + E1 - E2)/\Delta X \\
&= (B0 \cdot \Delta X \cdot L \cdot CT - 1/2 \cdot B0 \cdot \Delta X \cdot L \cdot CT0)/\Delta X \\
&= B0 \cdot L \cdot CT - 1/2 \cdot B0 \cdot L \cdot CT0
\end{aligned} \quad (9)
$$

For instance, when a current that is three times the magnetomotive force which causes magnetic saturation (CT=3·CT0) passes, the rotary force F1 is expressed as follows:

$$
\begin{aligned}
F1 &= B0 \cdot L \cdot 3 \cdot CT0 - 1/2 \cdot B0 \cdot L \cdot CT0 \\
&= 5/2 \cdot B0 \cdot L \cdot CT0
\end{aligned} \quad (10)
$$

In this case, five-sixths of the power applied is converted into rotary energy, and the energy turned into internal magnetic energy is only the reinding one-sixth of the power applied. Thus, the motor is most effectively operated in the magnetic saturation region.

In a d.c. motor, permanent magnet synchronous motor or the like, it is well known that the rotary force FF can be expressed by Equation (11), according to Fleming's left-hand rule.

In this case, it is assumed that the mean flux density BB is approximately half the saturated flux density B0 in a general motor structure in which the area occupied by the slots is equal to the area occupied by the teeth.

$$
\begin{aligned}
FF &= 2 \cdot BB \cdot L \cdot CT \\
&= B0 \cdot L \cdot CT
\end{aligned} \quad (11)
$$

Comparing Equation (10) with Equation (11) reveals that the rotary force F1 of FIG. 2 becomes close to the rotary force FF of a conventional electric motor in which field magnetic flux is generated by a separate means, such as a d.c. motor or the like, if the motor is operated in the flux saturated region.

In FIG. 2, it is obvious that the rotary force F1 of the motor has nothing to do with the widths of the projections of the stator and rotor, nor with the width X of the portion where the projections of the stator face the projections of the rotor.

Figure 4:
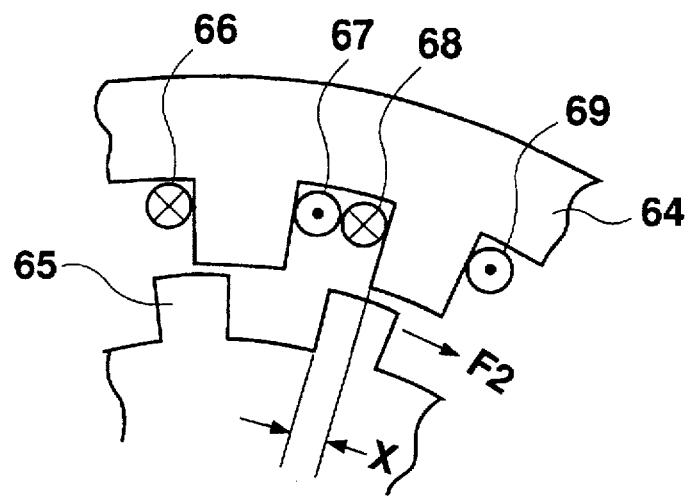
FIG. 4 is a schematic view illustrating the rotary force of the electric motor shown in FIG. 1.

In FIG. 4, two pairs of projections are disposed in a portion of the same width as in FIG. 2. A current CT, which is the same as the current passing through the motor windings 62 and 63 in FIG. 2, passes through the motor windings 66 and 67, as well as the motor windings 68 and 69, thereby making the rotary force F2 twice as large as the rotary force F1 expressed by Equations (6) and (10).

The current passing through the motor winding 67 is of the same value as the current passing through the motor winding 68, and these currents pass in opposite direction to each other out. Therefore, the magnetomotive forces generated from both windings cancel each other. Thus, the total magnetomotive force is equal to that generated by passing the current CT through the motor winding 66 to the motor winding 69, making it possible to obriate the motor windings 67 and 68. As a result, the doubled rotary force F2 is obtained by making each motor winding slightly longer at the coil end.

Further, the rotary force can be increased by NN times in the same area by increasing the number of projections of the stator and rotor by NN times without substantially altering the length of the motor windings. An increase in the length of the coil end causes an increase in copper loss, which is a minor problem in view of loss and efficiency in the entire motor.

In the following, the relationship between the length of the coil end and the motor efficiency with respect to copper loss of the motor will be described.

Figure 5:
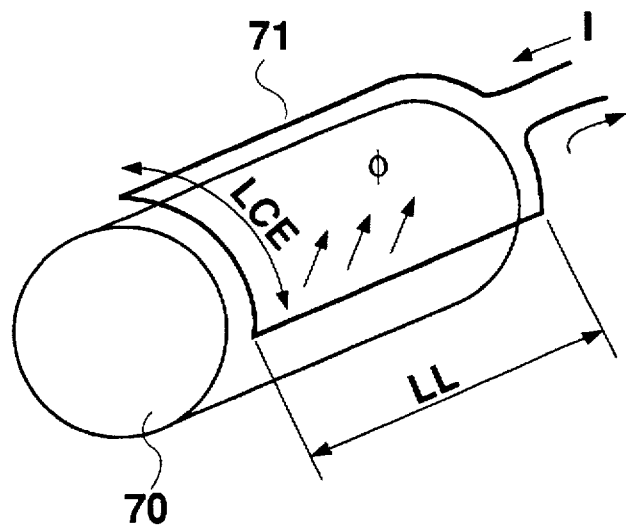
FIG. 5 is a schematic view illustrating the relationship between the length of the coil end and efficiency of the motor.

FIG. 5 shows a rotor 70 and a motor winding 71. The length of the coil end is denoted by LCE and the effective length of the rotor is denoted by LL. The motor can take any shape, such as a long-thin shape or a short-thick shape. If the rotor has a certain radius, by giving a large value to the rotor effective length LL compared with the coil end length LCE, the copper loss at the coil end can be relatively small and thus ignored.

The relationship between torque and unit volume, i.e. [torque/unit volume], will now be described with respect to basic performance characteristics of the motor. The change in magnetic energy E1–E2 of the motor is ignored for the purpose of simplification. As a general example, the motor has a shape as shown in FIG. 5, wherein [torque/unit volume] causes a problem such that a large rotary force FF is difficult to obtain with a constant current passing through the motor winding 71. According to Equation (1), the rotary force FF can be expressed as follows:

$$
\begin{aligned}
FF &= EIN/\Delta X \\
&= CT \cdot \Delta FL/\Delta X \\
&= CT \cdot dFL/dX
\end{aligned} \quad (12)
$$

In a d.c. motor, permanent magnet synchronous motor or the like, the rotary force FF can be expressed as FF=2·BB·L·CT according to Fleming's left-hand rule and Equation (11), wherein:

$$
dFL/dX = 2 \cdot BB \cdot LL \quad (13)
$$

which shows that the magnetic flux of flux density BB crosses the motor windings in synchronization with the rotation of the rotor 70.

The invention provides an electric motor which is able to obtain a larger value than dFL/dX expressed by Equation (13), and which causes only small ripples and rotates at a high speed. As shown by Equation (12), a large rotary force FF can be obtained by applying large power. Therefore, a current is passed through the motor windings so that a large amount of dFL/dX can be obtained, and the magnetic flux FL and flux density BB are not necessarily large. A specific example of this has already been described in the comparison between FIG. 2 and FIG. 4.

If the motor windings 67 and 68 are removed and the current CT is passed through the motor windings 66 and 69 so as to cause magnetic saturation in FIG. 4, dFL/dX is twice the amount of Equation (13) and twice the rotary force FF generated by a conventional d.c. motor or the like.

In accordance with the above logic, operations of the electric motor of this example shown in FIG. 1 will now be described.

Since the number of projections 55 of the rotor 54 is 35 on the left half thereof, a rotary force FC of 35/2 times as much is generated in the left half of the projections of the rotor 54 by passing the current CT through the winding 3 to the winding 21, taking into account Equations (6) and (9) explained with reference to FIGS. 2 and 4. Meanwhile, the right half of the motor operates in an opposite manner at the same time and a counter-clockwise rotary force FCC is generated, whereby the right half of the motor and the left half of the motor cancel each other out, making the total rotary force zero. The right and left of the motor are thus balanced. However, it is true that a partial rotary force of this motor is still larger than that of a conventional motor. This motor operates with the right and left magnetically unbalanced, as described above.

One of the specific operations of this motor is to generate a magnetomotive force at an appropriate angle with two-pole, three-phase a.c. windings wound as shown in FIG. 18. By applying a three-phase current, a magnetomotive force is generated, thus developing the rotary force FF in a direction in which the magnetic resistance becomes small. The magnetomotive distribution by the three-phase a.c. current is sinusoidal and has a slightly complicated relationship with the generated rotary force FF.

For instance, by passing a current through the winding 7 to the winding 25 in FIG. 1, a magnetomotive force is generated from the lower-right side to the upper-left side in FIG. 1. In this situation, the relationship between the stator 51 and the rotor 54 is unbalanced, wherein the magnetic resistance in the lower-right side is relatively smaller than the magnetic resistance in the upper-left side, thus generating a counter-clockwise rotary force so that the magnetic resistance in all the magnetic paths is in a direction in which the magnetomotive force acts. The flux density in the lower-right side is larger than the flux density in the upper-left side, and the rotary force FCC in the lower-right side is larger than the rotary force FC in the upper-left side. More specifically, it is necessary to determine the magnetomotive force applied to the projections of the stator 51 and the rotor 54 facing each other, determine the rotary force in accordance with Equation (6) or (9), and then accumulate them on the entire circumference of the motor.

The number of projections of the stator 51 is slightly different from the number of projections 55 of the rotor 54, whereby the projections of the stator 51 are slightly shifted from the projections 55 of the rotor 54. Thus, the torque ripples caused by the motor output torque which is the total of generated torques are small. The small difference between the number of projections of the stator 51 and the number of projections 55 of the rotor 54 is |m−n|=1 or |m−n|=2 as described above. In any event, the right half of the motor generates the counter-clockwise rotary force FCC while the left half of the motor generates the clockwise rotary force FC. The projections of the stator 51 and the projections 55 of the rotor 54 are of a vernier mechanism, indicating a relationship such that if the motor rotates 35 times the rotor 54 rotates once.

The driving frequency of the motor, compared with the driving frequency at a rotation speed, is 35 times larger than the three-phase a.c. frequency which drives a two-pole permanent magnet synchronous motor.

In the case where m=36, n=35, m>n, and the projections of the stator and the rotor face each other in the upper side of the motor as shown in FIG. 1, the rotary force generated in each part acts in the direction of FC or FCC as shown in FIG. 1. The rotary direction of the rotor herein is opposite to the phase rotary direction of the three-phase a.c. current.

Meanwhile, in the case where m=36, n=37, m<n, and the projections of the stator and rotor face each other in the upper side of the motor as shown in FIG. 1, the rotary force generated in each part acts in the opposite direction to FC or FCC. The rotary direction of the rotor herein is the same as the phase rotary direction of the three-phase a.c. current.

As another example of windings of the motor of FIG. 1, two-pole multi-phase a.c. stator windings, such as five-phase motor windings shown in FIG. 6, will now be described.

Figure 6:
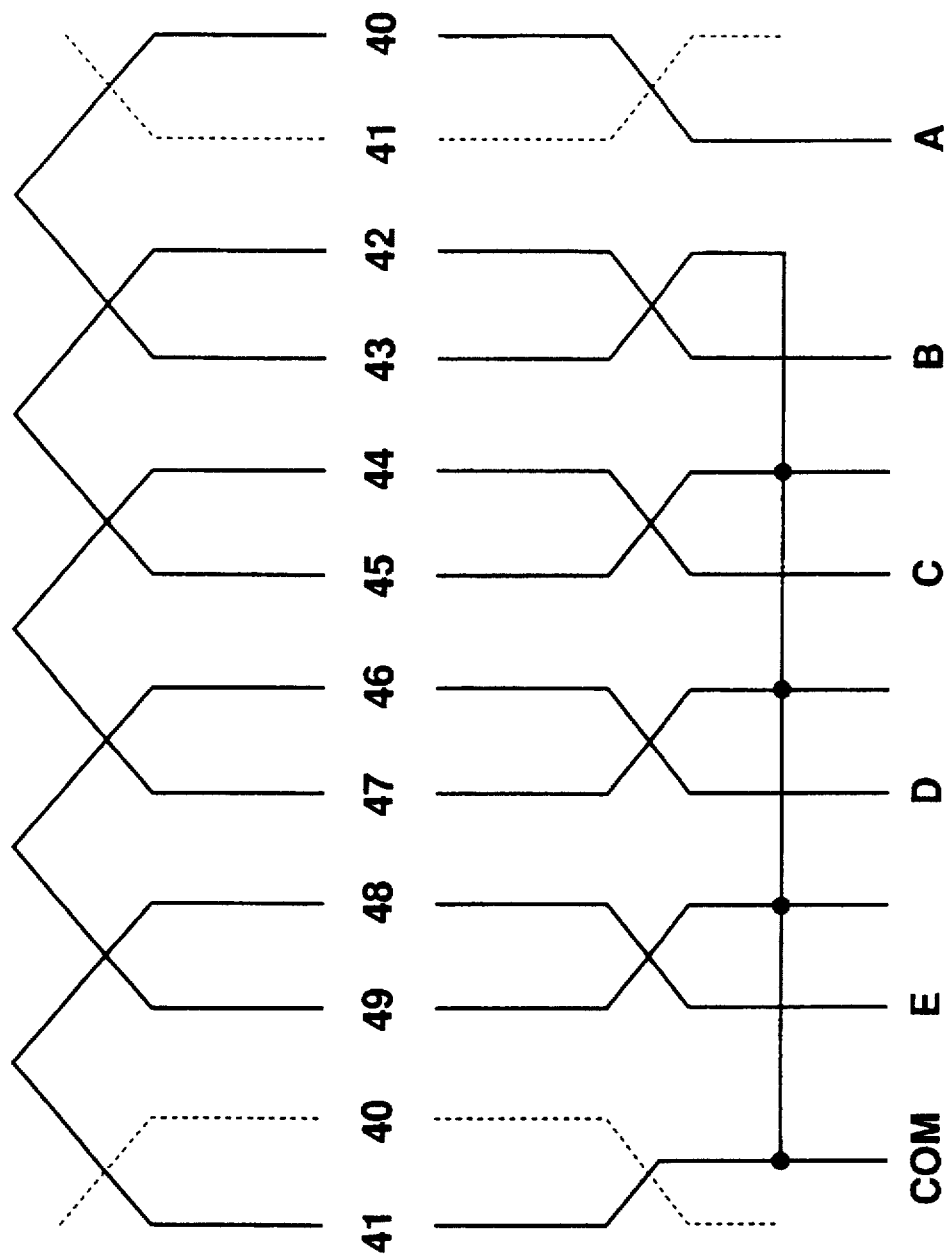
FIG. 6 is a schematic view of five-phase motor windings disposed in another example of an electric motor according to the invention.

FIG. 6 shows windings which are concentrated for the purpose of simplification. A desirable rotary force as expressed by Equations (6) and (9) can be obtained by winding around the entire circumference with five-phase motor windings and sequentially applying current of each phase. A larger rotary force can be effectively obtained by controlling the current passing through each motor winding so that the magnetic flux is looped only in sections where a rotary force is generated in the intended driving direction, and the flux density becomes small in sections where a rotary force is generated in the opposite direction to the intended driving direction. For instance, in the case where the motor operates in the clockwise direction in FIG. 1, the magnetic flux should be looped in the left half of the motor and there should be little magnetic flux in the right half of the motor.

More specifically, effective torques can be efficiently obtained if the phase number of windings is large, the coil pitch is smaller than an electrical angle of 180°, and only necessary magnetomotive forces are generated by applying a current to only necessary parts of the windings in the entire motor.

Besides the windings described so far, various multi-phase motor windings and modified motor windings can be used. For instance, single-phase windings and distributed windings are often used for the purpose of reducing the higher harmonics of magnetomotive forces. There are also methods in which partial motor windings are added or removed.

Figure 7:
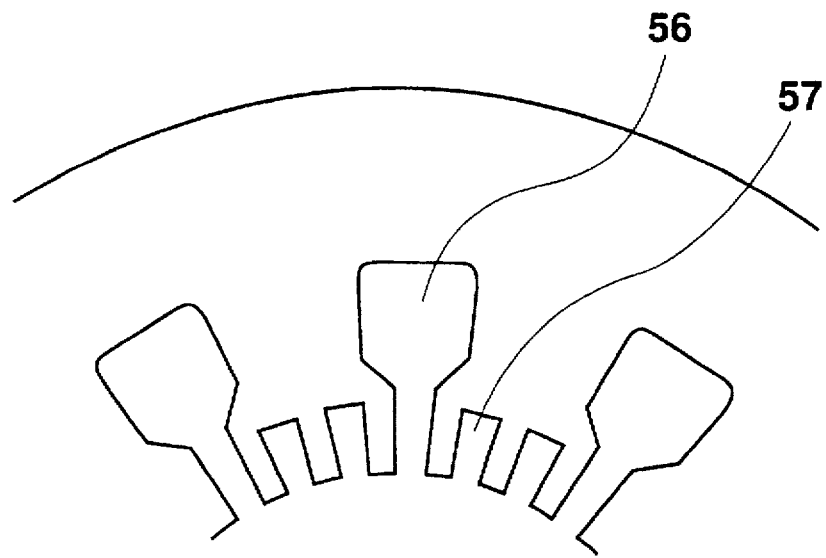
FIG. 7 is a schematic view of the major components of yet another example of an electric motor according to the invention.

FIG. 7 is a schematic view of yet another example of an electric motor according to the invention, which is a modified view of the stator structure of FIG. 1. FIG. 7 actually shows only the major components of the motor. The electric motor of this example is provided with slots 56 in which windings equivalent to those for 3 slots in FIG. 1 are collectively wound around, and cavities 57 for creating magnetic resistance for the stator. Such a structure simplifies the motor windings, but has disadvantages in that the magnetomotive force distribution gradually expands from the sinusoidal waveform and begins to contain lots of higher harmonics.

Figure 8:
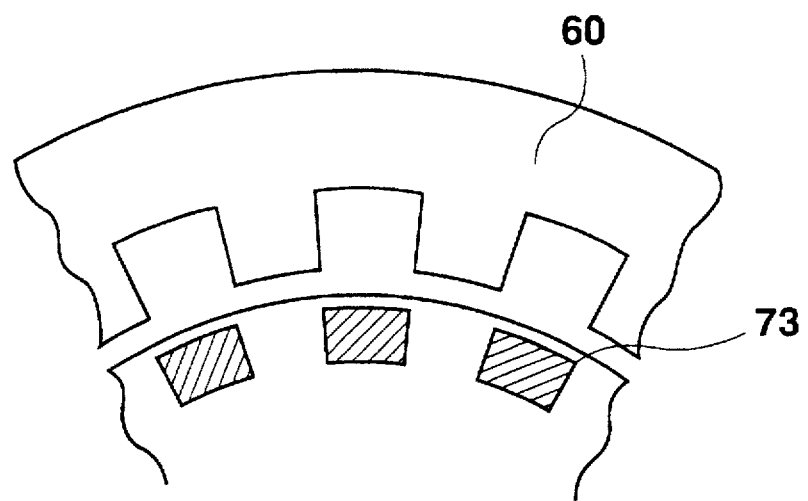
FIG. 8 is a schematic view of the major components of a further example of an electric motor according to the invention.

In the electric motor of this example, the stator has m portions in which large magnetic resistance and small magnetic resistance exist, and the rotor has n portions in which large magnetic resistance and small magnetic resistance exist. It is not necessary to make geometrical irregularities on the surfaces of the stator and rotor. As shown in FIG. 8, for example, it is possible to create magnetic resistance by forming voids 73 inside the circular outer periphery of the rotor. It is also possible to create magnetic resistance by forming voids inside the circular inner periphery of the stator, which is not shown in the drawings.

There are several points to be noted as to the electric motor of FIG. 1. Since the magnetic circuits and the magnetomotive forces therein are unbalanced, magnetomotive forces are generated in the axial direction of the rotor, making the magnetic flux of the rotor axis harmful. Therefore, in the case where flux leakage from the rotor axis is a problem, it is necessary to make the magnetic resistance large in the axial direction by using a non-magnetic material for components situated in places where flux leakage from the rotor axis occurs, such as the motor casing or the flanges fixed in front of and behind the rotor axis and the motor.

The imbalance of torques of magnetic attraction in the radial direction can be canceled by disposing a plurality of elements of 360° electrical angle of the motor which is compressed in the direction of rotation within a mechanical angle of 360°, as in the case where a two-pole conventional motor is converted into a four-pole motor. For instance, to incorporate two motors of FIG. 1 is to dispose one motor in a mechanical angle of 180°.

Although such multi-polarization lowers the rate of rotation angle change of the interlinkage flux per winding, it shortens the coil end and if the length of the motor is small, it reduces copper loss at the coil end, thus enhancing the motor efficiency. Such multi-polarization further reduces the thickness of the yoke of the stator.

Figure 9:
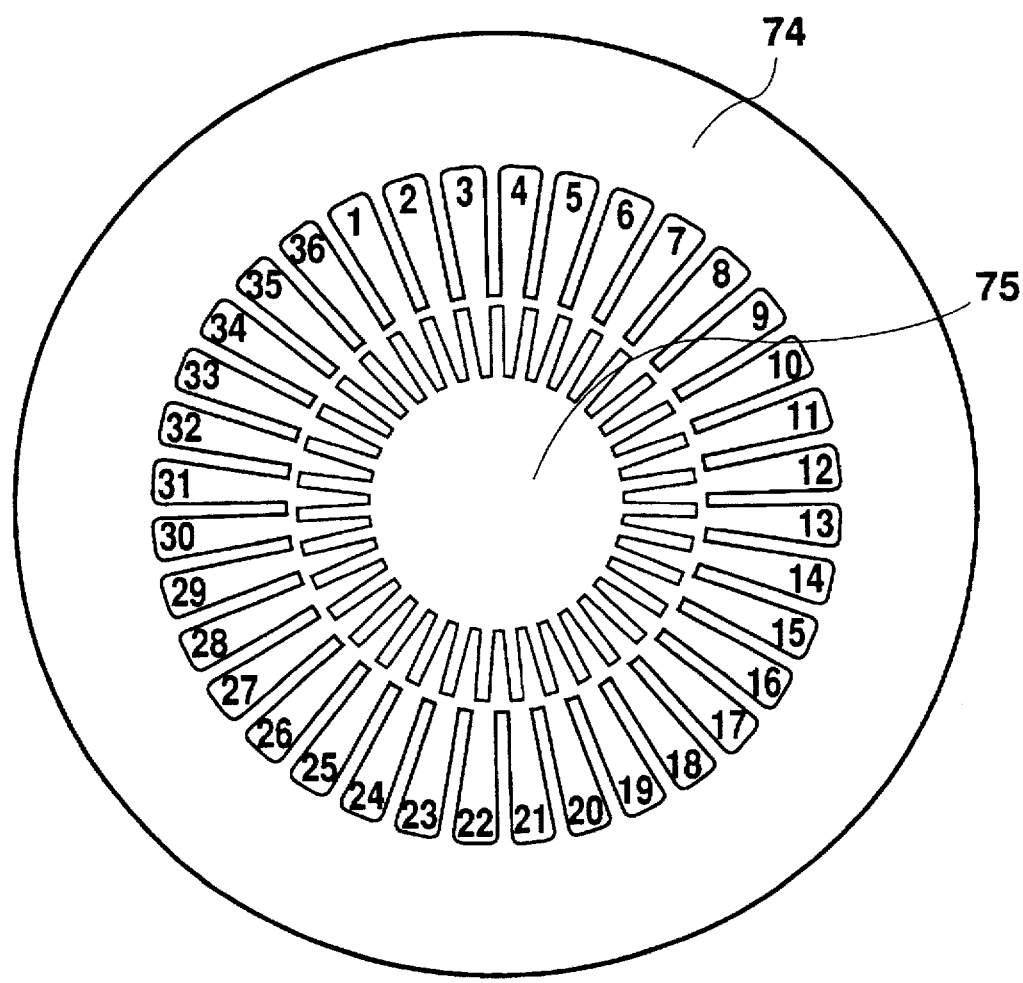
FIG. 9 is a cross-sectional view of still another example of an electric motor according to the invention.

FIG. 9 shows still another example of an electric motor according to the invention. This example enables the motor to rotate easily and to generate larger torque at a high speed. Although the ratio of the total width of the projections where the magnetic resistance is small is equal to the total width of the cavities where the magnetic resistance is large in the stator and rotor of the motor in FIG. 1, the total width of the projections in this example is smaller than that of the cavities as shown in FIG. 9 so that the magnetic resistance becomes larger. Thus, the motor of this example is characterized in that the width of the portions where the magnetic resistance is large is greater than the width of the portions where the magnetic resistance is small. As a result of this, the projections of the stator do not face the projections of the rotor in the lower side of FIG. 9, making the magnetic resistance of this part very large.

In the case where a current passes through the windings 10 and 28 to generate magnetomotive forces from the lower right to the upper left in FIG. 9, the total width of the flux path is very small so that the magnetic flux becomes small by phase control without reducing the magnetomotive forces, or without reducing the current applied. Thus, by shifting the current phase so that the magnetomotive forces act from further towards the down side to the upper side, the magnetic flux can be made small, and the amount of the reverse induced voltage which is generated in each winding during rotation can also be made small.

Accordingly, it is possible to operate the motor of this example in the same way as operating a d.c. motor with weakened fields at a high speed. Since a large current CT can be applied during high speed operation, the motor of this example is able to generate large torque.

In the following, description will be made of a method for enhancing rotary force.

Qualitatively, the addition of a magnetic circuit for bypassing magnetic flux reduces the magnetic flux that generates a rotary force in the opposite direction to the intended rotary direction, thus effectively utilizing the rotary force generated inside the motor. As described before, by passing a current through the winding 7 to the winding 25, magnetomotive forces are generated from the lower right to the upper left in FIG. 1, wherein the counter-clockwise rotary force FCC is larger than the clockwise rotary force FC due to the difference in flux density between the two windings, thus developing a rotary force from the difference between FCC and FC.

If it is possible to further reduce the rotary force FC in the opposite direction to the intended rotary direction as described above, the rotary force and the output of the motor will obviously become large.

This example will now be described in detail with reference to FIG. 10. The windings 1, 6, 7, 12, 13, 18, 19, 24, 25, 30, 31, and 36 of FIG. 1 are replaced by six-phase windings A1, A2, B1, B2, C1, C2, D1, D2, E1, E2, F1, and F2, respectively. The six-phase windings serve in the same manner as the five-phase windings of FIG. 6. FIG. 11 is a schematic view of the motor of FIG. 10, showing the relationship between the magnetomotive force and magnetic flux generated by each winding.

For instance, a current passing through the winding 8 to the winding 26 causes magnetomotive forces 78 and 79. A current passing through the replaced windings A1 and A2 causes magnetomotive forces 80, 81 and 82. The magnetomotive force 81 enhances the magnetomotive force 78 and cancels the magnetomotive force 79. The magnetic flux excited by the magnetomotive forces 78 and 81 is then attracted toward the magnetomotive force 80. The magnetic flux generated in the direction of the magnetomotive force 80 causes no rotary force in the motor, due to being laterally symmetrical in the rotary position shown in FIG. 10. As a result, the magnetic flux excited by the magnetomotive force 79 is reduced, and the clockwise rotary force is also reduced, whereby the total rotary force in the counter-clockwise direction is increased.

Figure 10:
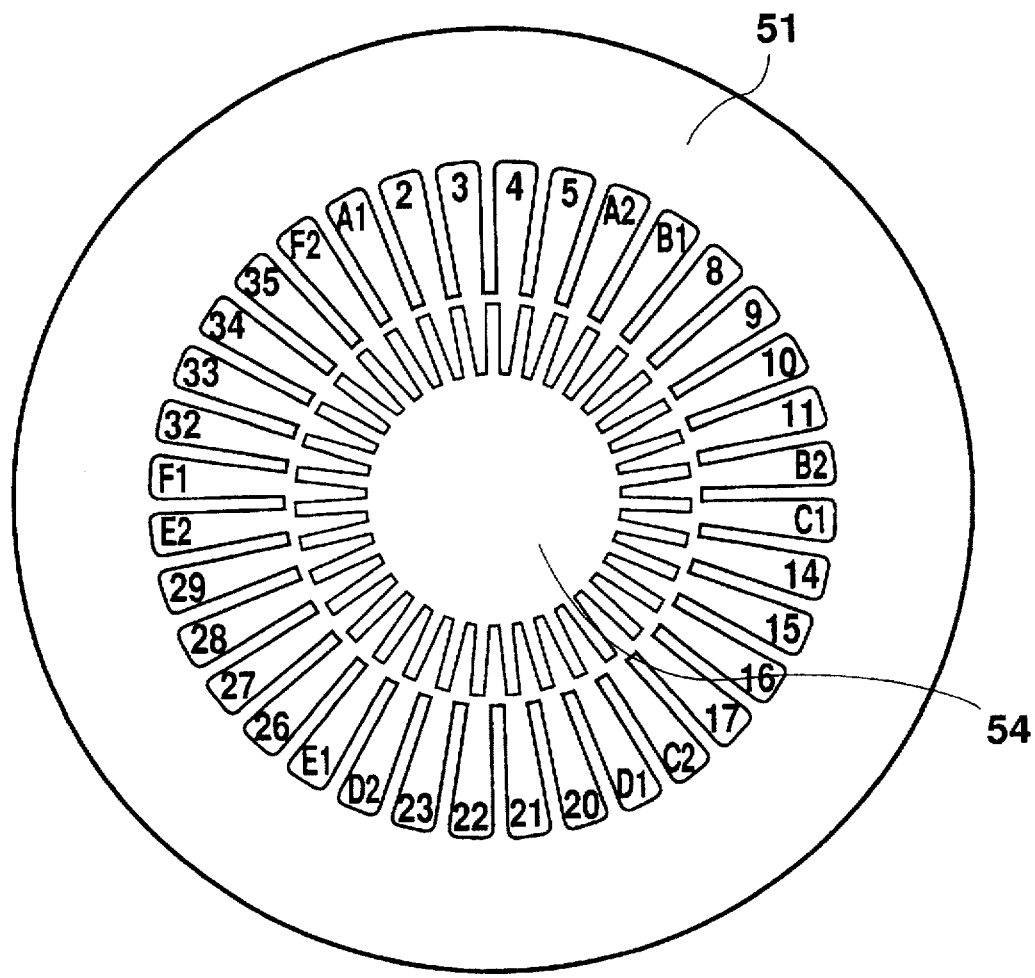
FIG. 10 is a cross-sectional view of yet another example of an electric motor of the invention.
Figure 11:
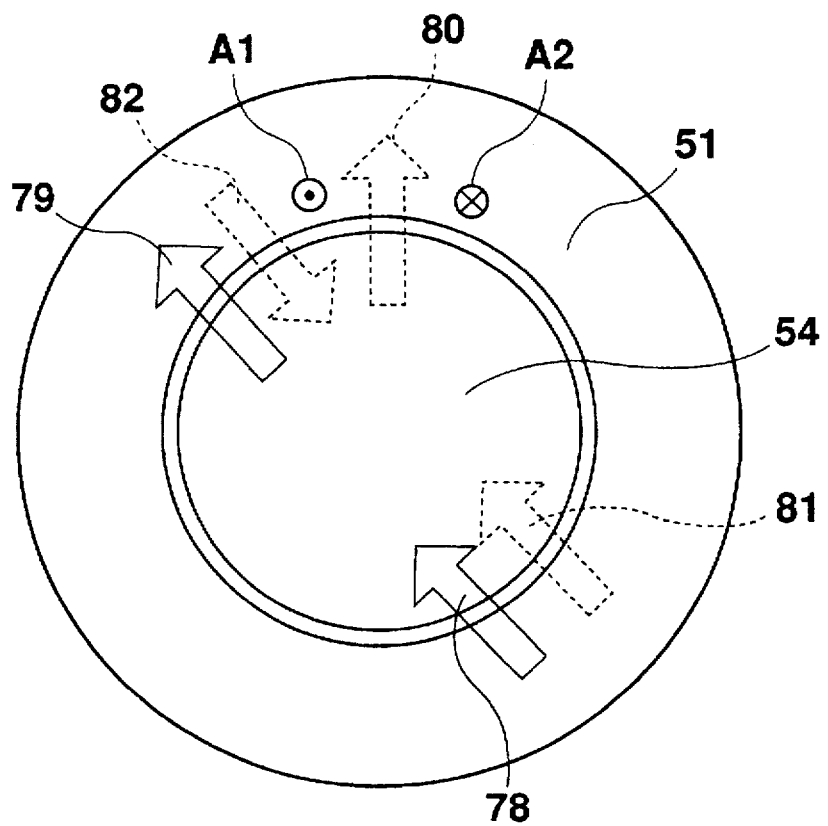
FIG. 11 is a schematic view illustrating the relationship between the magnetomotive force and magnetic flux generated by each winding in the electric motor shown in FIG. 10.

In this example shown in FIG. 10, some of the windings of FIG. 1 are replaced by the flux inducing windings A1 to F2. Further, various modifications of the windings are possible, for example, the motor windings of FIG. 1 can be superimposed.

Figure 12:
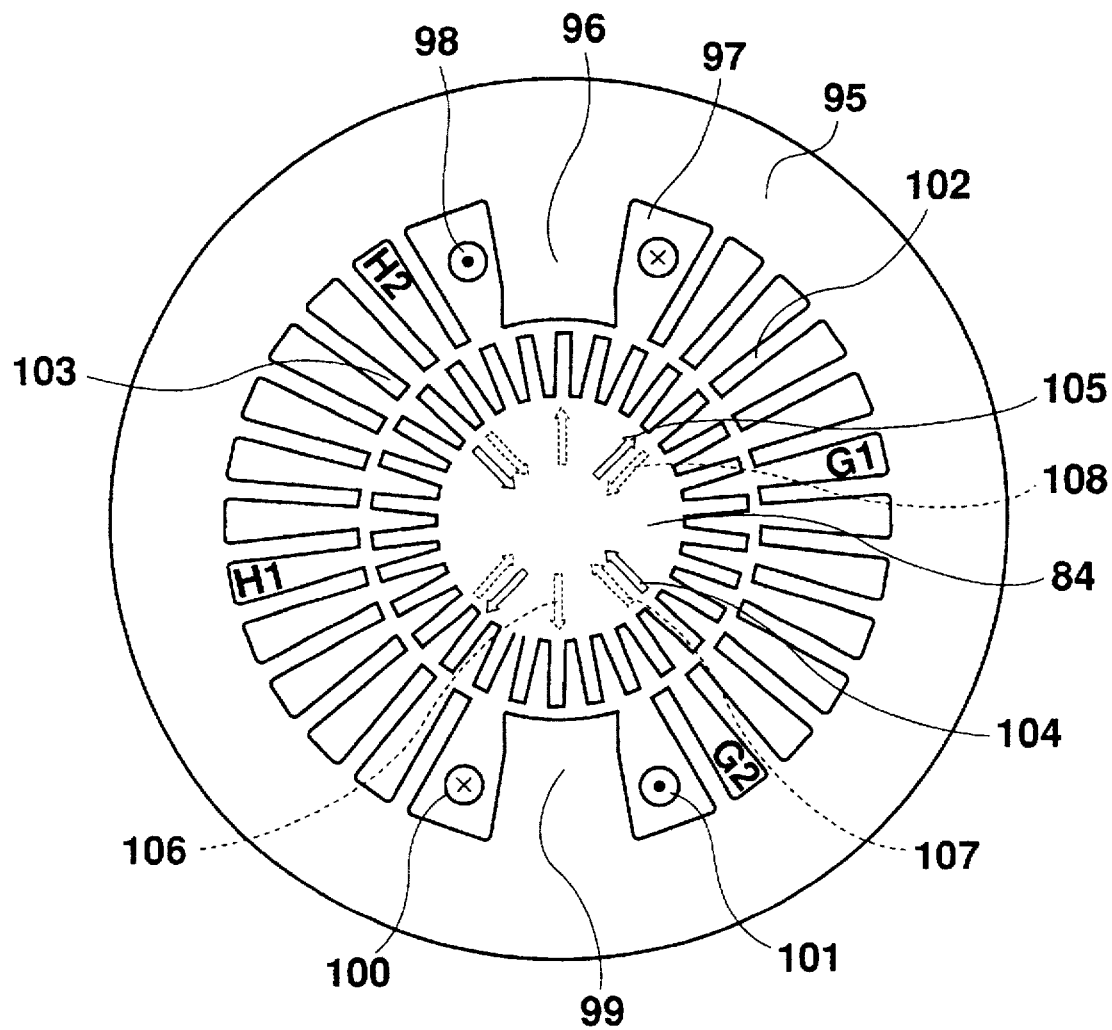
FIG. 12 is a cross-sectional view of still another example of an electric motor according to the invention.

FIG. 12 shows still another example of an electric motor according to the invention. A stator 95 comprises two drives equivalent to the motor of FIG. 1, and two magnetic paths for bypassing magnetic flux. There are twelve projections 102 in the right half of the stator 95, wherein three-phase a.c. windings are disposed so that the portion of about 130° mechanical angle functions at 360° degrees electrically. The 12 projections 102 face 11 projections of the rotor 84. As auxiliary means for inducing the magnetic flux that reduces torque toward the magnetic path where decrease in torque occurs less, the by-pass magnetic path 96 and the flux inducing windings 97 and 98 are disposed, as well as the by-pass magnetic path 99 and the flux inducing windings 100 and 101, which are disposed in the symmetrical positions.

Meanwhile, the portion of 130 in the left half of the motor of FIG. 12 has the same structure as the right half of the motor. There are also 12 projections 103 in the left half of the stator, wherein three-phase a.c. windings are disposed so that the portion of 130° mechanical angle has the same function as that of 360 degrees electrically. The 12 projections 103 in the left half of the stator face the 11 projections of the rotor 84.

The motor shown in FIG. 12 has a structure which is symmetrical with respect to the center point of the motor. Forces other than the rotary force are canceled with respect to the rotor axis. Of the magnetomotive forces generated by the flux inducing windings 97, 98, 100, and 101, those increasing the rotary force are enhanced and those disturbing the rotary force are canceled, as in the motor of FIG. 10. The by-pass magnetic paths 96 and 99 are designed to face three of the projections of the rotor 84 at whichever angle the rotor 84 is situated, wherein the magnetic resistance has nothing to do with the rotational positions of the rotor 84 and the stator 95. Therefore, no rotary force is generated at the by-pass magnetic paths 96 and 99 regardless of magnetomotive forces and magnetic flux.

Next, the operations of this motor will be explained in detail.

This motor is provided with multi-phase a.c. windings, as described so far. But now, description will be made of a case in which a current passes through particular windings for the purpose of simplification.

In the case where the rotor 84 rotates in the counter-clockwise direction in FIG. 12, a current passing through the winding G1 to the winding G2 generates a magnetomotive force 104 and a counter-clockwise rotary force. At the same time, a clockwise rotary force is generated due to a magnetomotive force 105.

In this situation, a current passing through the flux inducing winding 100 to the flux inducing wining 101 generates magnetomotive forces in directions of arrows 106, 107, and 108, thus enhancing the magnetomotive force 104, reducing the magnetomotive force 105, and inducing the magnetic flux in the direction of the magnetomotive force 105 toward the magnetomotive force 106. As a result, the counter-clockwise rotary force is increased and the clockwise rotary force is reduced, thus generating a counter-clockwise rotary force in total in the right half of the motor.

The same procedure is repeated in the left half of the motor at the windings H1 and H2 and flux inducing windings 97 and 98. Thus, the motor generates, in total, a rotary force twice that obtained in the right half of the motor. Description as to operations by applying a current through the windings H1, H2, 97, and 98 is omitted herein.

Now, if the magnetomotive force and magnetic flux to generate a rotary force regardless of the rotary direction are controlled so as to move from the stator 95 to the rotor 84, the magnetomotive force and magnetic flux should be induced toward the by-pass magnetic paths 96 and 99 from the rotor 84 side to the stator 95 side. Therefore, a d.c. current should be applied to the flux inducing windings 97, 98, 100, and 101, which constitutes a relatively simple d.c. driving circuit. There is another method in which a three-phase a.c. current is rectified by a diode and applied to the windings 97, 98, 100, and 101 in series, making a circuit with a relatively small burden.

In the case where the three-phase a.c. windings have star connections, there is a method in which a three-phase full-wave rectifying circuit is provided at the center of the winding which connects all other windings, and each winding is connected to the a.c. terminal of the three-phase full-wave rectifying circuit, and a d.c. rectifying terminal is connected to the flux inducing windings 97, 98, 100, and 101, wherein a d.c. current passes. In this case, the three-phase full-wave rectifying circuit can be disposed inside or in the vicinity of the motor, thereby simplifying the wiring to the motor.

Figure 13:
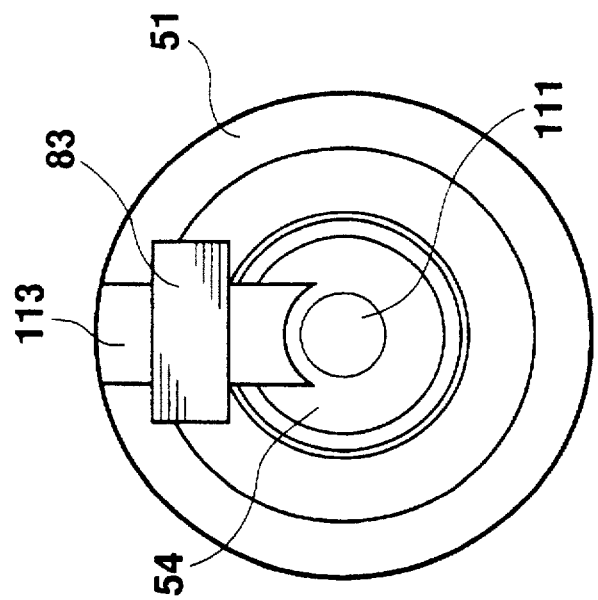
FIG. 13 is a cross-sectional view of yet another example of an electric motor according to the invention.
Figure 14:
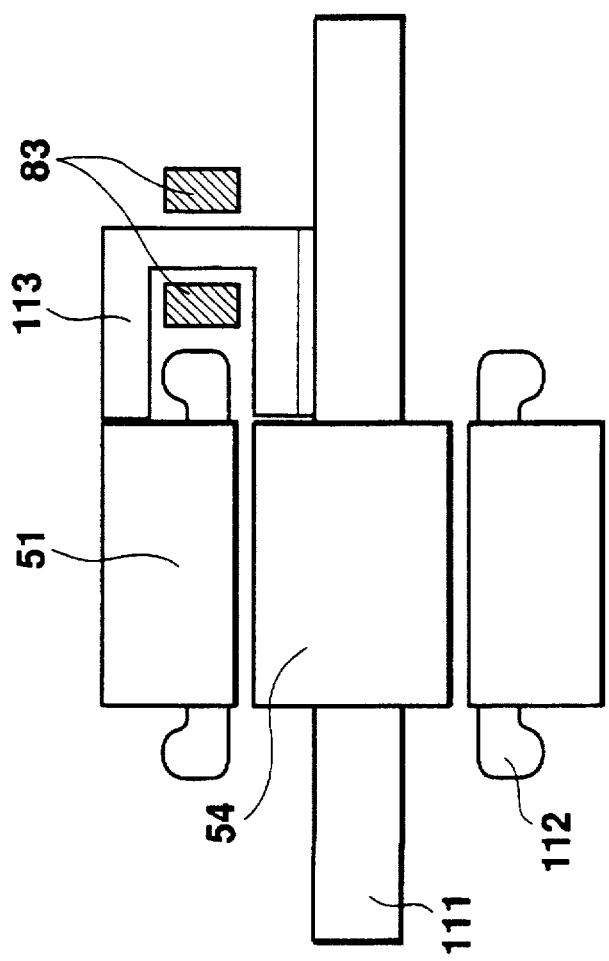
FIG. 14 is a longitudinal sectional view of the electric motor shown in FIG. 13.

It is also possible to dispose the by-pass magnetic paths 96 and 99 of FIG. 12 in the axial direction. FIGS. 13 and 14 show this example.

A by-pass magnetic path 113 for inducing the magnetic flux acting in the opposite direction to the driving direction and a flux inducing winding 83 are disposed from a magnetically common portion of the stator 51 to that of the rotor 54. By this structure, the same effects as in FIG. 10 can be expected.

The magnetic flux in the axial direction generates a force in the axial direction, but this force is supported by the bearing of the motor and causes no rotary force. It is possible to make a plurality of magnetic paths in the axial direction so that the forces in the axial direction cancel one another out.

In the case where magnetomotive forces are generated only in the necessary portions by applying the multi-phase winding as shown in FIG. 6 to the motor of FIGS. 12, 13, and 14, the by-pass magnetic paths 96, 99, and 113 are capable of reducing the magnetic resistance in the area where the rotary force is reduced, and are quite effective without the flux inducing windings 97, 98, 100, 101, and 83.

Figure 15:
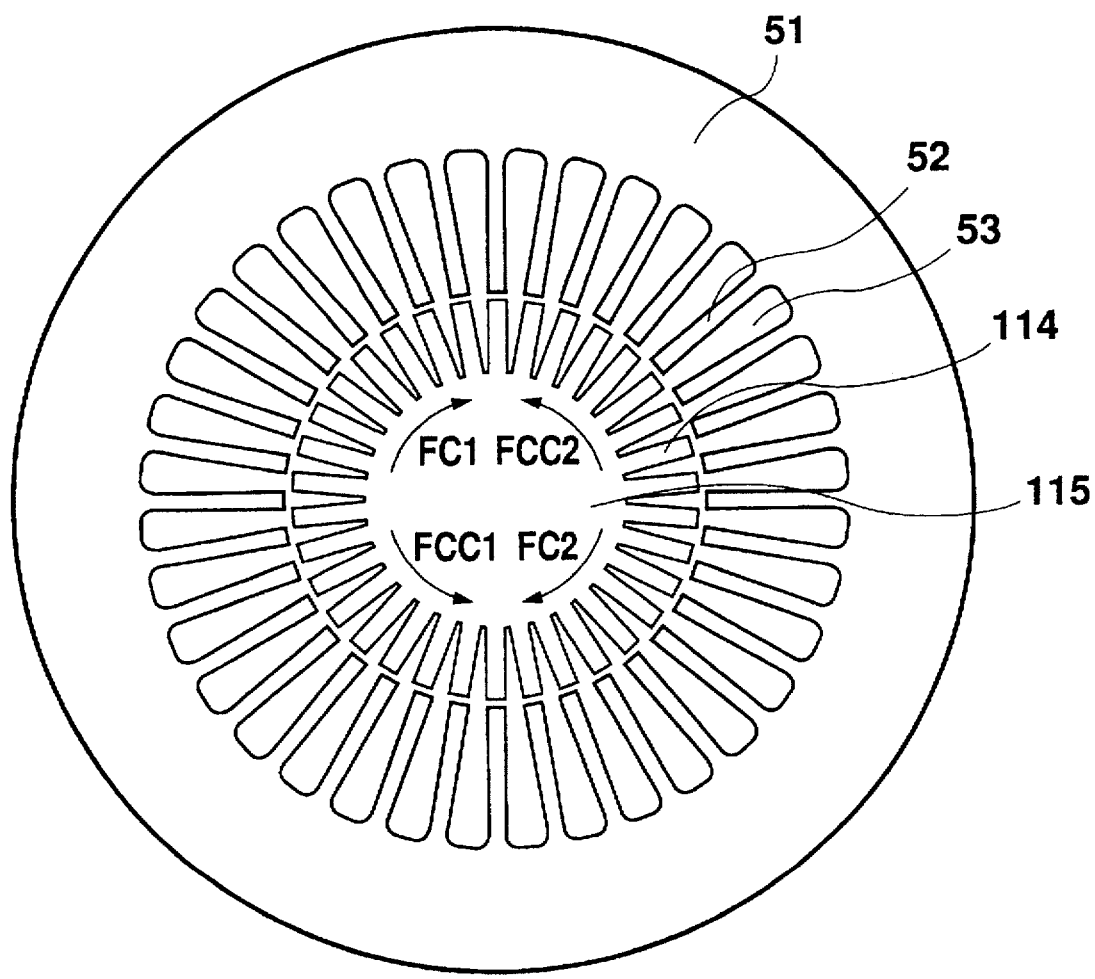
FIG. 15 is a cross-sectional view of still another example of an electric motor according to the invention.

FIG. 15 is a cross-sectional view illustrating still another example of an electric motor according to the invention.

The stator 51 of this motor has the same structure as the stator shown in FIG. 1. The rotor 115 comprises 34 projections 114. The magnetic resistance is small at the positions where the projections of the stator 51 and the projection 114 of the rotor 115 face each other, wherein the rotor 115 makes a 1/34 revolution to rotate the motor through an angle of 180 degrees. The magnetic resistance between the stator 51 and the rotor 115 is large at the positions shifted at an angle of 90 degrees from the positions where the magnetic resistance between the rotor 115 and the stator 51 is small. On the assumption that there is magnetic flux between the rotor 115 and the stator 51, the clockwise rotary forces FC1 and FC 2, and the counter-clockwise rotary forces FCC1 and FCC2 are generated in the rotor 115 as shown in FIG. 15.

For instance, by passing a current from the winding 3 to the winding 21, the rotary forces of the respective parts cancel each other out and therefore the total rotary force becomes practically zero. A current passing through the winding 9 to the winding 27 generates large magnetomotive forces at the positions corresponding to FC1 and FC2, and causes small magnetomotive forces at the positions corresponding to FCC1 and FCC2, thereby developing a rotary force in the clockwise direction.

The windings of FIG. 18 can be used as the windings of the motor shown in FIG. 15. It is also possible to employ multi-phase windings as shown in FIG. 6 and energize necessary portions to develop a rotary force, as in the motor of FIG. 1.

More efficient drive becomes possible by generating magnetomotive forces only in portions necessary in operation using multi-phase windings as shown in FIG. 18. Similarly, it is possible to generate large torque at a high rotation speed by controlling the current phase so that the amount of magnetic flux generated inside the motor becomes small.

For the motor shown in FIG. 15, it is possible and effective to multi-polarize and employ an auxiliary means, such as magnetic paths for bypassing unnecessary magnetic flux in the same way as in the modified example of the motor shown in FIG. 12.

In the case where $|m-n|=k$, $m>k$, $n>k$, and k is an integer larger than 2, and where a current is appropriately applied to each phase of multi-phase windings, a rotary force can be obtained as in the motors of FIGS. 1 and 15. The phase rotation speed of the current of each phase is about n/k times the rotation speed of the rotor.

For this motor, it is also possible and effective to multi-polarize and employ an auxiliary means, such as magnetic paths for bypassing unnecessary magnetic flux in the same way as in the modified example of the motor shown in FIG. 12.

Figure 16:
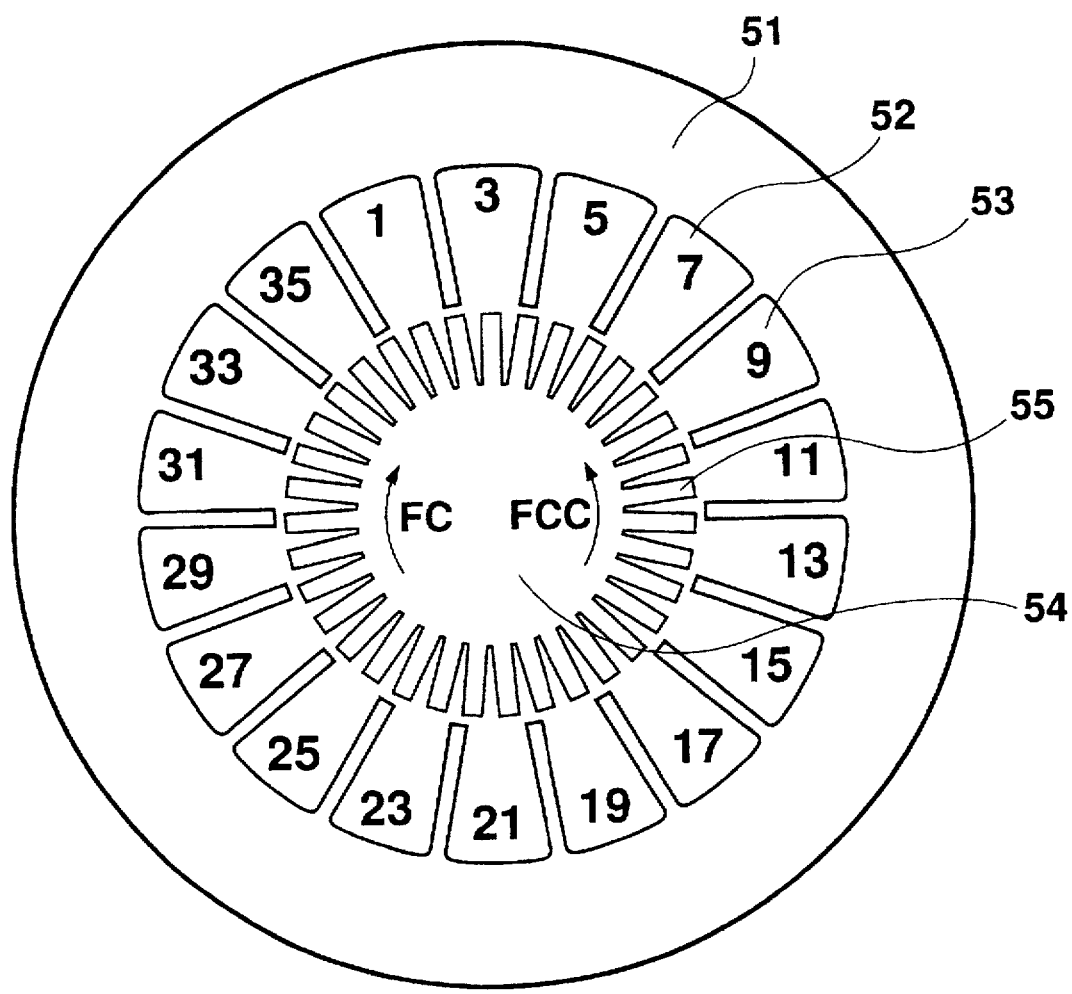
FIG. 16 is a cross-sectional view of yet another example of an electric motor according to the invention.
Figure 17:
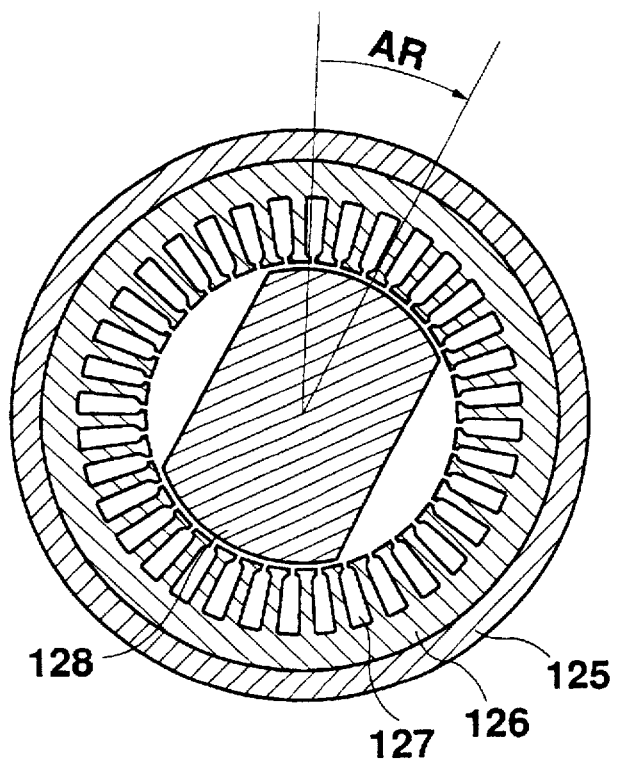
FIG. 17 is a cross-sectional view of a conventional synchronous motor having a salient two-pole rotor.

Various examples of an electric motor according to the invention have been described so far, but the invention includes modifications of each example in which part of the components is omitted, but which still exhibit similar effects. For instance, the motor shown in FIG. 16 is a motor of FIG. 1 from which half of the projections of the stator are removed. Such a motor substantially operates in the same manner as the motor of FIG. 1 and has advantages in that areas for disposing windings can be expanded and the structure of the windings can be simplified due to the reduced number of windings, despite fewer magnetic paths and smaller torque.

Modifications as described above are included in the scope of the invention because they can produce similar effects with part of the projections of the stator or rotor removed.

The maximum limits of the number m and the number n for the projections of the stator and rotor, respectively, depend on the magnetic resistance between the stator and rotor, and are determined by the air-gap length between the stator and rotor, the gap width between the projections of the stator, and the gap width between the projections of the rotor. More specifically, the numbers can be determined by dividing the outer periphery of the rotor by the air-gap length.

Although explanations have been made of the cases in which the projections of the stator and rotor are rectangular, the projections are not necessarily rectangular and may have a distorted shape, such as a skewed shape.

Motors can also be made into a complex structure. As multiple rotary directions and multi-polarization have been discussed in the examples, the scope of the invention also includes multiple rotary axis directions, multiple radial directions, and the like.

As a modified example of the invention, it is possible to make a rotor provided with a plurality of portions where pitches of the rotor and stator are different from each other and a rotary force can be developed by energizing an appropriate winding in accordance with the torque.

Explanations have been made of the electric motors in which the magnetic flux acts in the radial direction, but it is possible to modify the motors in which the magnetic flux acts in the rotor axis direction and the stator and rotor face each other in the rotor axis direction. There are, for example, flat-type motors and the like.

Explanations have been made of rotational motors. However, the invention also includes linear or curvilinear motors.

What is claimed is:

1. An electric motor comprising:

a stator having m number of salient poles formed on an inside periphery thereof; and a rotor having n number of salient poles formed on an outside periphery thereof and a winding-and-permanent-magnet-less structure, n being different from m;

wherein a width in a rotor rotation direction of a tip end of each of the salient poles of the stator is substantially the same as a width in the rotor rotation direction of a non-magnetic material portion comprising a cavity formed between adjacent salient poles;

a width in a rotor rotation direction of a tip end of each of the salient poles of the rotor is substantially the same as a width in the rotor rotation direction of a non-magnetic material portion comprising a space between adjacent salient poles;

the stator has windings which are multi-phase windings, each of the windings being disposed such that each winding applies magnetomotive forces at the same time to at least two of the stator salient poles; and a reluctance varying between the salient poles of the stator and the salient poles of the rotor, magnetomotive forces due to the stator windings generating reluctance forces to thereby generate rotation torque.

2. An electric motor as defined in claim 1, further comprising:

auxiliary means for inducing magnetic flux to a magnetic path where a reduction of torque is smaller than in other magnetic paths, the magnetic flux generating torque in an opposite direction to that of the rotation torque generated.

3. An electric motor according to claim 1, wherein the width of portions of said first magnetic resistance is greater than the width of portions of said second magnetic resistance in said stator and the width of portions of said third magnetic resistance is greater than the width of portions of said fourth magnetic resistance in said rotor.

4. An electric motor according to claim 1, wherein the magnetic circuits in said stator and said rotor are formed by laminating electromagnetic steel sheets.

* * * * *